(12) United States Patent
Takahashi et al.

(10) Patent No.: US 9,998,351 B2
(45) Date of Patent: Jun. 12, 2018

(54) GATEWAY DEVICE

(71) Applicants: Katsuyoshi Takahashi, Tokyo (JP); Ryuichi Kitaichi, Tokyo (JP)

(72) Inventors: Katsuyoshi Takahashi, Tokyo (JP); Ryuichi Kitaichi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 172 days.

(21) Appl. No.: 14/777,952

(22) PCT Filed: Mar. 21, 2013

(86) PCT No.: PCT/JP2013/058033
§ 371 (c)(1),
(2) Date: Sep. 17, 2015

(87) PCT Pub. No.: WO2014/147784
PCT Pub. Date: Sep. 25, 2014

(65) Prior Publication Data
US 2016/0057047 A1 Feb. 25, 2016

(51) Int. Cl.
*H04L 12/751* (2013.01)
*H04L 12/64* (2006.01)
(Continued)

(52) U.S. Cl.
CPC .............. *H04L 45/02* (2013.01); *H04L 12/18* (2013.01); *H04L 12/6418* (2013.01); *H04L 12/66* (2013.01); *H04L 49/25* (2013.01)

(58) Field of Classification Search
None
See application file for complete search history.

(56) References Cited

U.S. PATENT DOCUMENTS 6,522,654 B1 * 2/2003 Small ................. H04L 12/6418
370/252
6,873,603 B1 3/2005 Ivaturi
(Continued)

FOREIGN PATENT DOCUMENTS

JP 5-153136 A 6/1993
JP 2000-134207 A 5/2000
(Continued)

OTHER PUBLICATIONS

Extended European Search Report dated Aug. 8, 2016 in Patent Application No. 13878638.9.
(Continued)

*Primary Examiner* — Lonnie V Sweet
(74) *Attorney, Agent, or Firm* — Oblon, McClelland, Maier & Neustadt, L.L.P.

(57) ABSTRACT

When a packet to a terminal is received from a terminal, a management communication processing unit transmits by broadcasting or multicasting to a network a destination information query packet for investigating a gateway device to which the terminal is connected, receives from a gateway device a destination information response packet for notifying that the terminal is connected to the gateway device, and updates a terminal information storage table based on the destination information response packet. When the terminal information storage table is erased, the history information exchange unit transmits by broadcasting or multicasting to the network a history information query packet for requesting to re-notify of the terminal that has been notified in the destination information response packet, receives from the gateway device a history information response packet for re-notifying of the terminal, and updates the terminal information storage table based on the history information response packet.

8 Claims, 14 Drawing Sheets

(51) Int. Cl.
*H04L 12/18* (2006.01)
*H04L 12/66* (2006.01)
*H04L 12/947* (2013.01)

(56) References Cited

U.S. PATENT DOCUMENTS

| | | |
|---|---|---|
| 2003/0053450 A1 | 3/2003 | Kubota et al. |
| 2004/0010619 A1* | 1/2004 | Thomas ............ H04L 29/12009 709/245 |
| 2005/0025051 A1* | 2/2005 | Roeder ............. H04L 29/12009 370/230 |
| 2006/0098589 A1 | 5/2006 | Kreeger et al. |
| 2008/0052384 A1* | 2/2008 | Marl .................. H04L 12/2807 709/223 |
| 2010/0183005 A1* | 7/2010 | Kaneko .................. H04L 12/12 370/389 |
| 2011/0280242 A1 | 11/2011 | Kugel et al. |

FOREIGN PATENT DOCUMENTS

| | | |
|---|---|---|
| JP | 2003-92586 A | 3/2003 |
| JP | 2004-128816 A | 4/2004 |
| JP | 2008-124791 A | 5/2008 |
| JP | 2008-153766 A | 7/2008 |
| JP | 2008-263279 A | 10/2008 |
| JP | 2009-38461 A | 2/2009 |
| JP | 2010-220174 A | 9/2010 |

OTHER PUBLICATIONS

International Search Report dated Jun. 25, 2013 in PCT/JP13/058033 Filed Mar. 21, 2013.
Office Action dated Mar. 13, 2017 in European Patent Application No. 13 878 638.9.
Office Action dated Nov. 3, 2017, in Chinese Patent Application No. 201380074709.X (with English-language translation).

* cited by examiner

Fig. 5

| TERMINAL ID | G/W ID | INTERFACE ID |
|---|---|---|
|  |  |  |
|  |  |  |
|  |  |  |

Fig. 6

| TERMINAL ID | G/W ID |
|---|---|
|  |  |
|  |  |
|  |  |

GATEWAY DEVICE

TECHNICAL FIELD

The present invention relates to a technology for efficiently restoring a table indicating a packet relay destination when the table is erased.

BACKGROUND ART

For the purpose of extending a layer 2 network or expanding the scale thereof, a packet may be sent using a plurality of types of network technology.

For example, in Patent Literature 1, an Ethernet (registered trademark) packet is sent using IP/MPLS (Internet Protocol/Multi Protocol Label Switching).

In the technology of Patent Literature 1, when a packet is relayed at an edge node, a transmission source MAC (Media Access Control) address of the packet is learned to build an address learning table.

Then, when a packet is to be relayed, a relay destination is determined based on this address learning table.

For a packet to a destination which has not been registered in the address learning table, a relay destination is investigated by flooding.

On the other hand, as a measure for preventing flooding for a packet to a destination which has not been learned, a technique may be considered in which two or more layer 2 switches constituting a layer 2 network mutually exchange MAC addresses each has learned, thereby building an address learning table.

For example, Patent Literature 2 discusses a technique in which two or more layer 2 switches mutually exchange MAC addresses each has learned, suggesting that an address learning table can be built without relaying a packet.

CITATION LIST

Patent Literature

Patent Literature 1: JP 2003-092586 A
Patent Literature 2: JP 2008-124791 A

SUMMARY OF INVENTION

Technical Problem

Conventional technologies have a problem, which is that until address learning is performed by relaying a packet or address learning is performed by exchanging data with another device, flooding occurs for a packet to a destination which has not been learned, consuming a communication bandwidth.

In particular, there is a problem, which is that when a relay device included in a network is restarted, information which has been obtained by learning up to that point is cleared, so that flooding continues to consume the communication bandwidth until the information is re-learned and the flooding is contained.

Even if learned information is obtained from another relay device when the relay device is restarted, obtaining all pieces of learned information consumes a lot of the communication bandwidth, and learned information from another relay device may include information which is not necessary for the relay device that is restarted. This is inefficient.

The present invention has been made in view of the above problems, and primarily aims to efficiently restore a table indicating a connection relation between a terminal device and a relay device even if the table is erased, thereby reducing communication bandwidth consumption.

Solution to Problem

A gateway device according to the present invention is connected to an internal network to which are connected one or more internal terminal devices, and is connected to an external network to which are connected a plurality of relay devices to each of which are connected one or more external terminal devices, and has a connection relation table indicating, in each record, an external terminal device and a relay device to which the external terminal device is connected, and the gateway device includes a table updating unit to, each time a communication packet whose destination is any one of the external terminal devices is received from the internal network, refer to the connection relation table, and transmit by broadcasting or multicasting to the external network an investigation packet for investigating a relay device to which a destination external terminal device is connected when a record on the destination external terminal device of the communication packet does not exist in the connection relation table, receive from the relay device to which the destination external terminal device is connected a connection notification packet for notifying that the destination external terminal device is connected to the relay device, and update the connection relation table based on the connection notification packet received;

a re-notification request unit to, when the connection relation table is erased, transmit by broadcasting or multicasting to the external network a re-notification request packet for requesting the relay device that has transmitted the connection notification packet to re-notify of the external terminal device that has been notified in the connection notification packet; and a table restoration unit to receive from the relay device that has transmitted the connection notification packet a re-notification response packet for re-notifying of the external terminal device that has been notified in the connection notification packet, and restore the connection relation table based on the re-notification response packet received.

Advantageous Effects of Invention

According to the present invention, when a connection relation table indicating a connection relation between a terminal device and a relay device is erased, a re-notification request packet is transmitted and a re-notification response packet is received in response to the re-notification request packet, so that the connection relation table can be restored efficiently based on the received re-notification response packet.

Therefore, an occurrence of flooding can be prevented, and communication bandwidth consumption can be reduced.

BRIEF DESCRIPTION OF DRAWINGS

FIG. 5 is a diagram illustrating an example of a terminal information storage table according to the first embodiment;

FIG. 6 is a diagram illustrating an example of a terminal information exchange history according to the first embodiment;

DESCRIPTION OF EMBODIMENTS

The first to fourth embodiments hereinafter describe configurations in which when a gateway device (to be also represented as "G/W" hereinafter) is restarted, the learning state of a relay table before restarting is promptly restored, thereby reducing bandwidth consumption and CPU (Central Processing Unit) resources consumption.

First Embodiment

Figure 7:
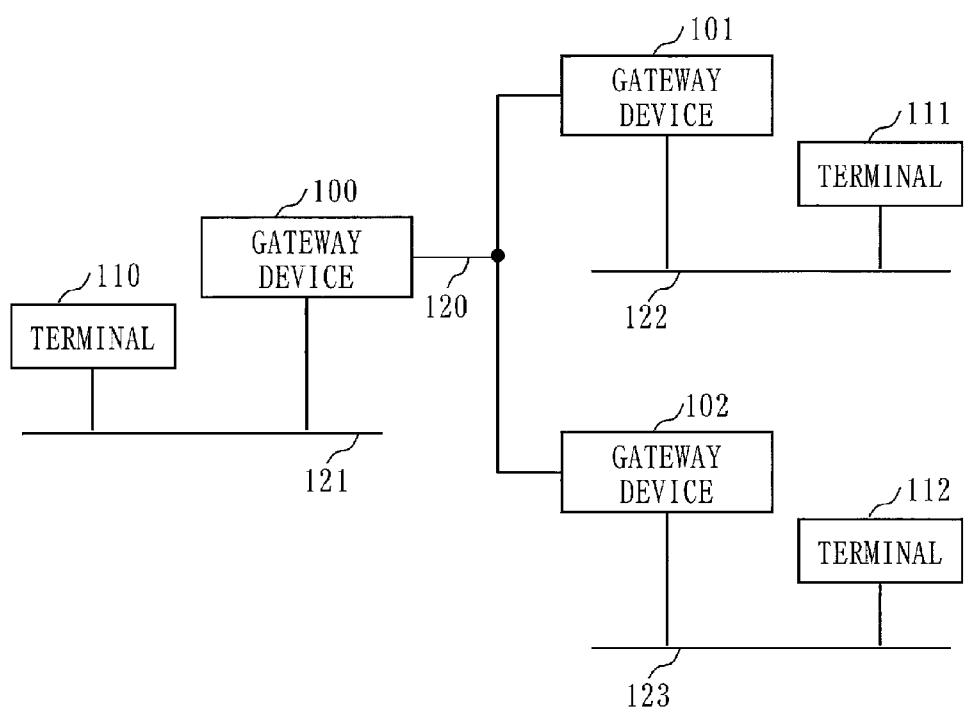
FIG. 7 is a diagram illustrating an example of the configuration of the communication system according to the first embodiment.

This embodiment describes a communication system in which a plurality of gateway devices each being connected to a terminal device (to be represented as "terminal" in the drawings) are connected through a network 120, as illustrated in FIG. 7.

That is, a gateway device 100 and a terminal device 110 are connected through a network 121. A gateway device 101 and a terminal device 111 are connected through a network 122. A gateway device 102 and a terminal device 112 are connected through a network 123. The gateway device 100, the gateway device 101, and the gateway device 102 are connected through the network 120.

The number of gateway devices and the number of terminal devices illustrated in FIG. 7 are examples.

The network 120 connecting the gateway devices is a general-purpose network, and the networks 121, 122, and 123 each connecting a gateway device and a terminal device are dedicated communication networks.

In the general-purpose network 120 between the gateway devices, a packet to be transmitted and received through a dedicated communication network is transmitted and received after being encapsulated.

For each gateway device, the dedicated communication network corresponds to an internal network, and the general-purpose network corresponds to an external network.

For each gateway device, a terminal device included in the dedicated communication network corresponds to an internal terminal device, and a terminal device external to the dedicated communication network corresponds to an external terminal device.

For example, for the gateway device 100, the terminal device 110 corresponds to an internal terminal device, and the terminal device 111 and the terminal device 112 each correspond to an external terminal device.

For each gateway device, another gateway device corresponds to a relay device.

For simplicity of description, a relation of the gateway device 100 and the terminal device 110 with the gateway device 101 and the terminal device 111 will be mainly described hereinafter.

A relation of the gateway device 100 and the terminal device 110 with the gateway device 102 and the terminal device 112 and a relation of the gateway device 101 and the terminal device 111 with the gateway device 102 and the terminal device 112 are substantially the same as the relation of the gateway device 100 and the terminal device 110 with the gateway device 101 and the terminal device 111.

In this embodiment, when the gateway device 100 receives a packet from the terminal device 110 to the terminal device 111, the gateway device 100 transmits by broadcasting or multicasting a destination information query packet (an example of an investigation packet) for inquiring about a gateway device being connected to the terminal device 111.

The gateway device 100 receives from the gateway device 101 a destination information response packet (an example of a connection notification packet) for notifying that the terminal device 111 is connected to the gateway device 101, and updates a terminal information storage table to be described later, based on the received destination information response packet.

When the terminal information storage table is erased as a result of restarting the gateway device 100, the gateway device 100 transmits by broadcasting or multicasting, to the gateway device that has transmitted the destination information response packet, a history information query packet (an example of a re-notification request packet) for requesting a re-notification of the content which has been notified in the destination information response packet.

Then, the gateway device 100 receives from the gateway device 101 a history information response packet as a response to the history information query packet, and restores the terminal information storage table based on the received history information response packet.

When the gateway device 101 receives the destination information query packet from the gateway device 100, the gateway device 101 transmits the destination information response packet to the gateway device 100.

When the gateway device 101 receives the history information query packet from the gateway device 100, the gateway device 101 transmits the history information response packet to the gateway device 100.

Figure 1:
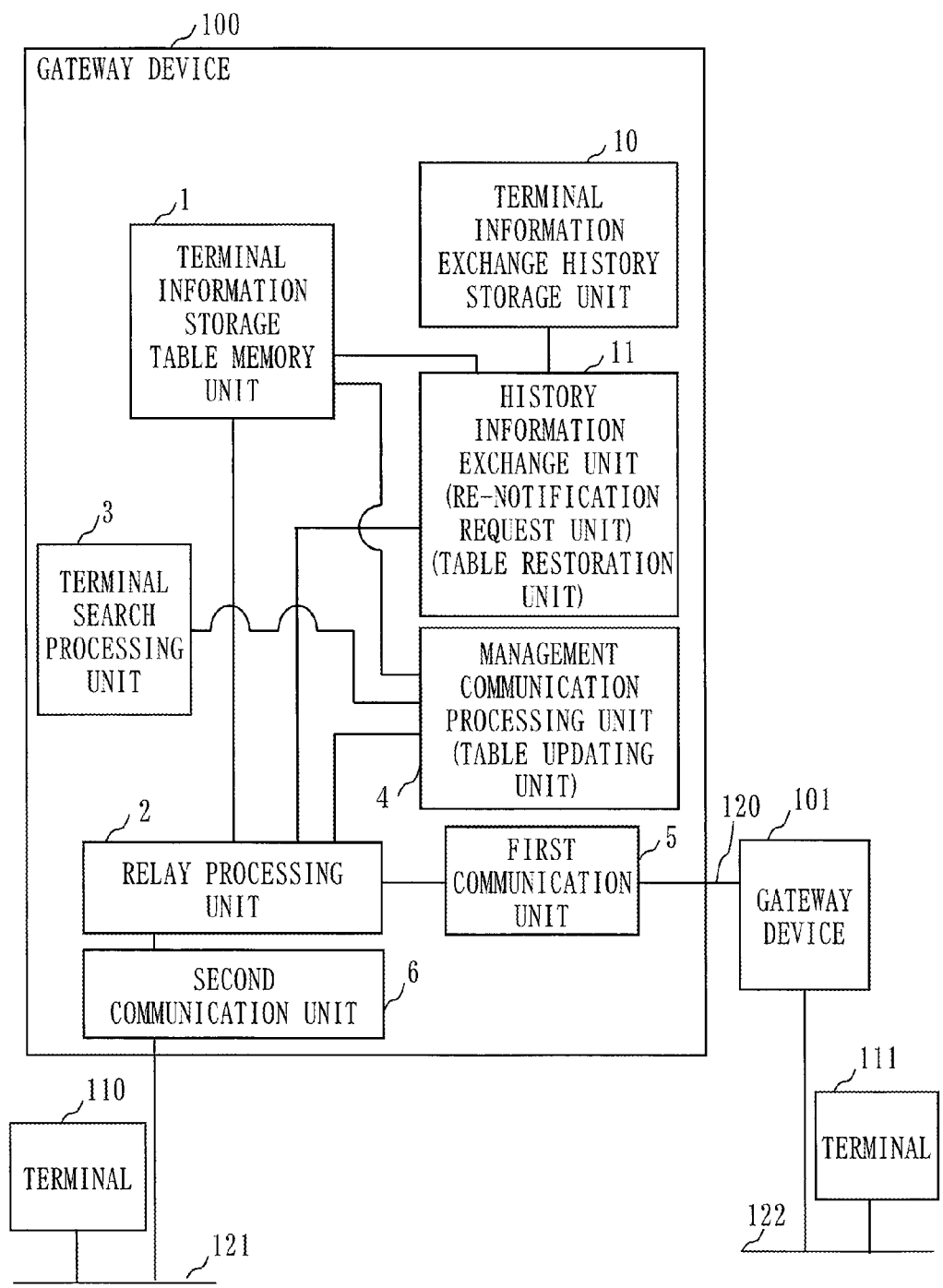
FIG. 1 is a diagram illustrating an example of the configuration of a gateway device according to a first embodiment.
Figure 2:
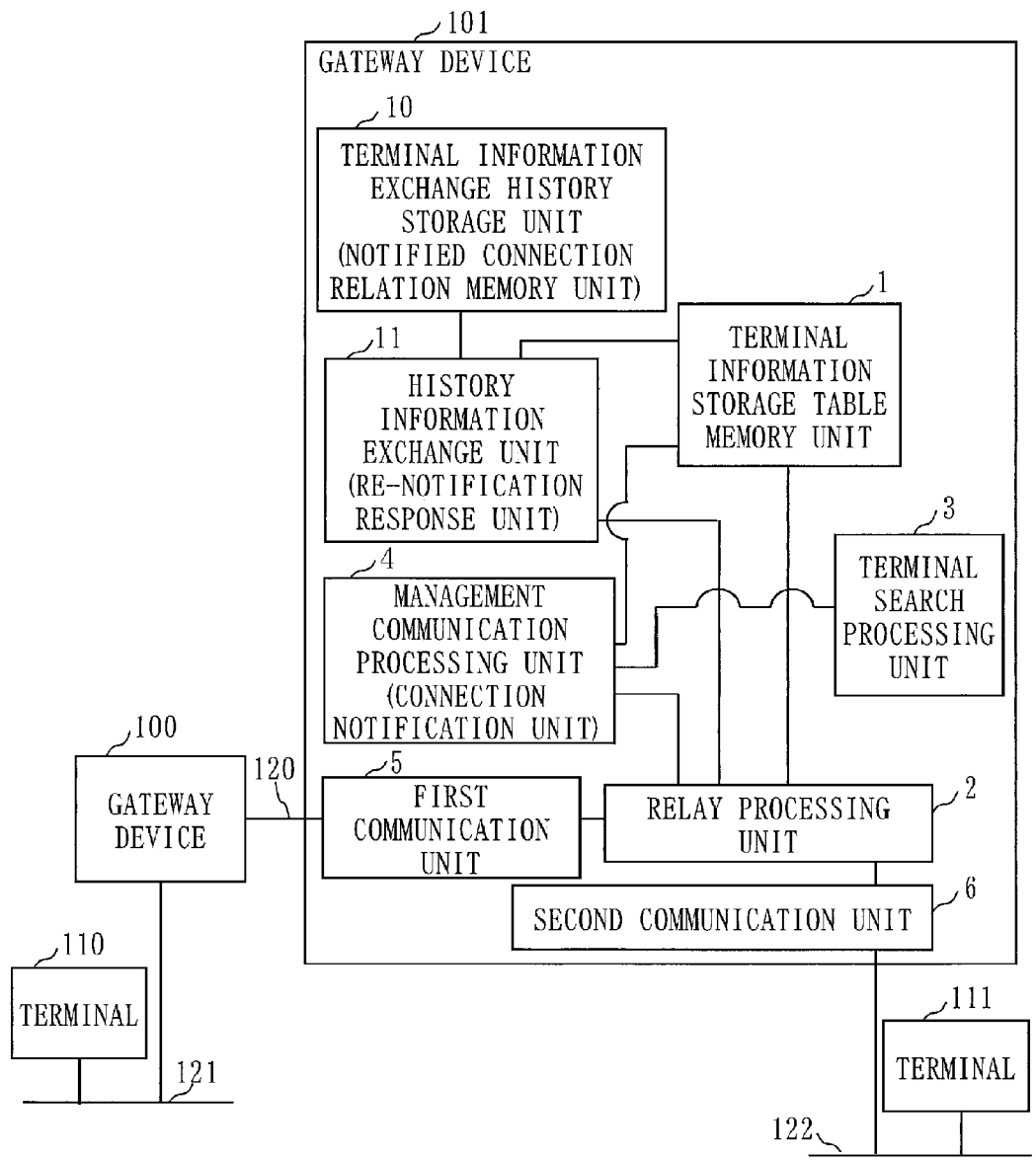
FIG. 2 is a diagram illustrating an example of the configuration of a gateway device according to the first embodiment.

FIG. 1 illustrates an example of the internal configuration of the gateway device 100, and FIG. 2 illustrates an example of the internal configuration of the gateway device 101.

As illustrated in FIG. 1 and FIG. 2, the gateway device 100 and the gateway device 101 have the same internal configuration. In this embodiment, however, the gateway device 100 and the gateway device 101 operate differently as described above. Thus, in a description with reference to FIG. 1, each component will be described in accordance with the above-described operation of the gateway device 100, and in a description with reference to FIG. 2, each component will be described in accordance with the above-described operation of the gateway device 101.

In FIG. 1, a first communication unit 5 is an interface to the network 120.

That is, the first communication unit 5 transmits and receives a packet to and from the gateway device 101.

A second communication unit 6 is an interface to the network 121.

That is, the second communication unit 6 transmits and receives a packet to and from the terminal device 110.

A terminal information storage table memory unit 1 stores the terminal information storage table.

As illustrated in FIG. 5, the terminal information storage table is a table indicating an ID (identifier) of a destination terminal device such as a terminal address, an ID of a gateway device to which the destination terminal device is connected, and an ID of an interface through which a packet to the terminal device is transmitted.

In FIG. 5, for example, an ID of the terminal device 111 is written in the terminal ID column, an ID of the gateway device 101 is written in the G/W ID column, and an ID of the first communication unit 5 is written in the interface ID column.

The terminal information storage table corresponds to an example of a connection relation table.

A relay processing unit 2 determines a transmission destination interface from the terminal information storage table based on the destination information of a received packet, and forwards the packet.

For example, when the second communication unit 6 receives a packet from the network 121, the relay processing unit 2 identifies the first communication unit 5 as the transmission destination interface by referring to the terminal information storage table, and causes the first communication unit 5 to transmit the packet to the network 120.

When the first communication unit 5 receives a packet from the network 120, the relay processing unit 2 identifies the second communication unit 6 as the transmission destination interface by referring to the terminal information storage table, and causes the second communication unit 6 to transmit the packet to the network 121.

A terminal search processing unit 3 will be described with reference to FIG. 2.

A management communication processing unit 4 performs management communication with another gateway device.

More specifically, each time a communication packet destined to an external terminal device (for example, the terminal device 111) is received from the network 121, the management communication processing unit 4 refers to the terminal information storage table. If the terminal information storage table does not have any record on the external terminal device to which the communication packet is destined, the management communication processing unit 4 transmits by broadcasting or multicasting a destination information query packet (an example of the investigation packet) through the first communication unit 5 to the network 120.

Then, the management communication processing unit 4 receives through the first communication unit 5 a destination information response packet (an example of the connection notification packet) from the gateway device to which the external terminal device being the transmission destination is connected (for example, the gateway device 101).

Further, the management communication processing unit 4 updates the terminal information storage table based on the received destination information response packet.

The management communication processing unit 4 in the gateway device 100 corresponds to an example of a table updating unit.

A terminal information exchange history storage unit 10 will be described with reference to FIG. 2.

A history information exchange unit 11 exchanges terminal information with another gateway device based on a terminal information exchange history.

More specifically, when the terminal information storage table is erased, the history information exchange unit 11 transmits by broadcasting or multicasting a history information query packet (an example of the re-notification request packet) to the network 120.

The history information query packet is a packet for requesting the gateway device that has transmitted the destination information response packet to re-notify of the terminal device that has been notified in the destination information response packet.

Then, the history information exchange unit 11 receives a history information response packet (an example of a re-notification response packet) from the gateway device that has transmitted the destination information response packet.

The history information response packet is a packet for re-notifying of the terminal device that has been notified in the destination information response packet.

The history information exchange unit 11 restores the terminal information storage table based on the received history information response packet.

The history information exchange unit 11 in the gateway device 100 corresponds to an example of a re-notification request unit and a table restoration unit.

In FIG. 2, the terminal information storage table memory unit 1, the relay processing unit 2, the first communication unit 5, and the second communication unit 6 are substantially the same as those described with respect to the gateway device 100, and will not be described.

The terminal search processing unit 3 checks whether or not there exists a terminal device being connected to the network 122.

If it is determined that such a terminal device exists, the terminal search processing unit 3 registers the information on that terminal device in the terminal information storage table.

In the gateway device 101, when a destination information query packet is received from another gateway device (for example, the gateway device 100), the management communication processing unit 4 transmits a destination information response packet (an example of the connection notification packet) to the gateway device that has transmitted the destination information query packet (for example, the gateway device 100) if the terminal device being inquired about (for example, the terminal device 111) exists in the network 122 (if this terminal device is connected to the gateway device 101).

The destination information response packet is a packet for notifying that the terminal device being inquired about (for example, the terminal device 111) is connected to the gateway device 101.

The management communication processing unit 4 in the gateway device 101 corresponds to an example of a connection notification unit.

The terminal information exchange history storage unit 10 stores a history of exchanging terminal information with another gateway device (terminal information exchange history).

That is, when the management communication processing unit 4 transmits a destination information response packet, the terminal information exchange history storage unit 10 stores the terminal device that has been notified in the destination information response packet (for example, the terminal device 111) and the gateway device that has transmitted the destination information query packet (for example, the gateway device 100) by associating the terminal device with the gateway device.

The terminal information exchange history storage unit 10 holds a terminal information exchange history as illustrated in FIG. 6, for example.

In FIG. 6, a terminal ID is an ID of the terminal device that has been notified in the destination information response packet (for example, the terminal device 111), and a G/W ID is an ID of the gateway device that has transmitted the destination information query packet (for example, the gateway device 100).

The terminal information exchange history storage unit 10 corresponds to an example of a notified connection relation memory unit.

When a history information query packet is received, the history information exchange unit 11 in the gateway device 101 transmits a history information response packet to the gateway device that has transmitted the history information query packet (for example, the gateway device 100) based on the terminal information exchange history stored in the terminal information exchange history storage unit 10.

The history information exchange unit 11 in the gateway device 101 corresponds to an example of a re-notification response unit.

Figure 3:
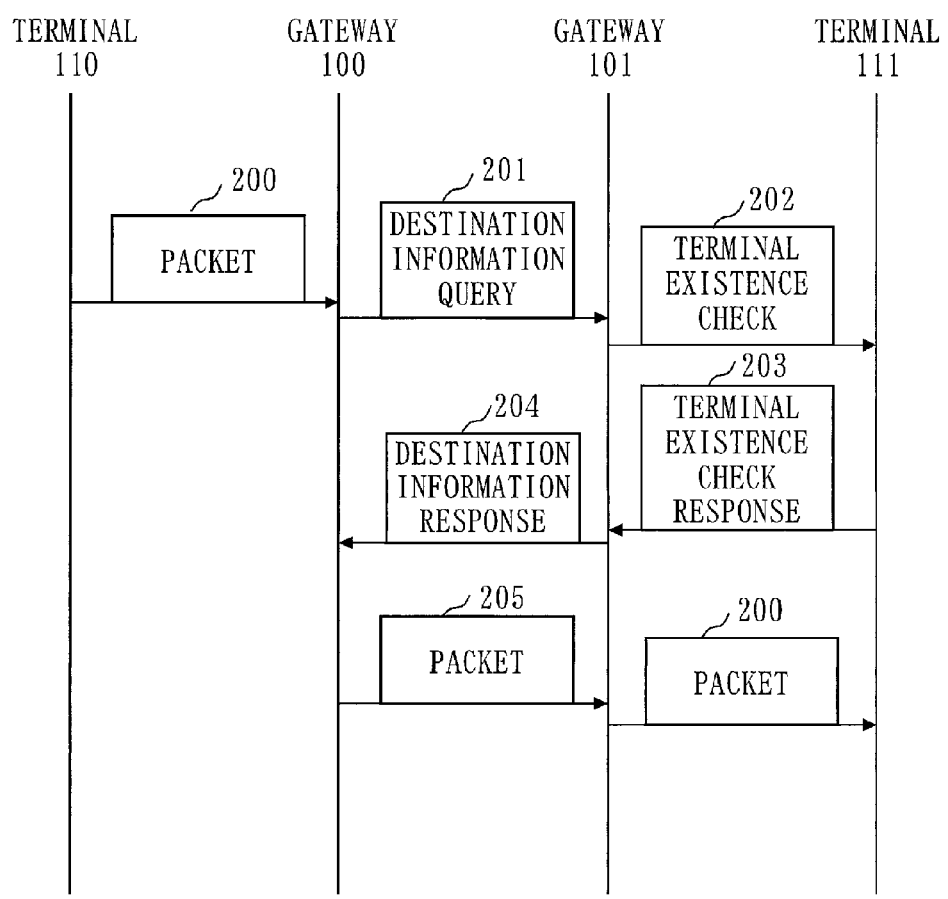
FIG. 3 is a diagram illustrating an example of a communication sequence in a communication system according to the first embodiment.

FIG. 3 illustrates an example of a communication sequence according to this embodiment.

In FIG. 3, a packet 200 is a packet to the terminal device 111 that is transmitted by the terminal device 110.

A packet 201 is a destination information query packet that is transmitted by the gateway device 100.

A packet 202 is a terminal existence check packet that is transmitted by the gateway device 101.

A packet 203 is a terminal existence check response packet that is transmitted by the terminal device 111.

A packet 204 is a destination information response packet that is transmitted by the gateway device 101.

A packet 205 is a packet that is created by encapsulating the packet 200 so as to be sent through the general-purpose network.

In the network 121 and the network 122, each terminal device has an identifiable node address, and communication is performed by specifying a destination terminal device using its node address.

On the other hand, the network 120 is a general-purpose network employing an Ethernet (registered trademark) technology or an IP (Internet Protocol) technology, as described above.

In the communication system according to this embodiment, different dedicated communication networks are connected through a general-purpose network, and a gateway device serves as a relay device.

In the general-purpose network 120 between the gateway devices, it is necessary to encapsulate a packet to be transmitted and received through a dedicated-communication network into a packet for the general-purpose network.

The operation will now be described.

With reference to FIG. 1 to FIG. 3, a description will be directed to the operation of the terminal device and the operation of the gateway device for realizing communication between the terminals in the communication system envisaged in this embodiment.

The terminal device 110 being connected to the gateway device 100 transmits the packet 200 for the dedicated communication network which is destined to the terminal device 111.

In the gateway device 100, the second communication unit 6 receives the packet 200, and the second communication unit 6 forwards the packet 200 to the relay processing unit 2.

The relay processing unit 2 looks for an entry (record) that matches the destination information of the packet 200 in the terminal information storage table.

If there is no entry (record) that matches the destination information of the packet 200, the relay processing unit 2 instructs the management communication processing unit 4 to search for the destination information of the packet 200.

The management communication processing unit 4 transmits by broadcasting or multicasting the destination information query packet 201 for inquiring about the destination information of the packet 200 to the general-purpose network 120 being connected to the interface (the first communication unit 5) which is different from the interface that has received the packet 200 (the second communication unit 6).

In the gateway device 101, the first communication unit 5 receives the packet 201, and the first communication unit 5 forwards the packet 201 to the management communication processing unit 4.

The management communication processing unit 4 identifies the packet 201 as a destination information query packet, and refers to the terminal information storage table to look for the destination information being inquired about, and checks whether or not the destination information exists.

If the destination information does not exist in the terminal information storage table, the terminal search processing unit 3 is invoked.

The terminal search processing unit 3 transmits by broadcasting or multicasting the terminal existence check packet 202 concerning the destination information being inquired about to the dedicated communication network 122 being connected to the interface (the second communication unit 6) other than the interface that has received the packet 201 (the first communication unit 5).

The terminal device 111 which has received the terminal existence check packet 202 transmits the terminal existence check response packet 203 to the gateway device 101 that has transmitted the terminal existence check packet 202 if the existence check is being made for the terminal device 111 itself.

In the gateway device 101, the second communication unit 6 receives the terminal existence check response packet 203.

Then, the second communication unit 6 forwards the packet 203 to the terminal search processing unit 3.

The terminal search processing unit 3 stores in the terminal information storage table the information on the terminal device 111 which is included in the terminal existence check response packet 203, and invokes the management communication processing unit 4.

An example is described herein in which the terminal search processing unit 3 searches for the terminal device. Alternatively, a search for the terminal device existing in the network 122 may be conducted and the information on the terminal device existing in the network 122 may be stored in the terminal information storage table in advance.

As a method for the search, all addresses included in the network 122 may be searched sequentially, or the search may be conducted based on terminal information which is set externally in advance.

Alternatively, when a packet transmitted from a terminal device on the network 122 is received, the information on the terminal that has transmitted the packet may be registered in the terminal information storage table.

The destination information being inquired about by the destination information query packet 201 has now been registered in the terminal information storage table as the information on the terminal device 111. Accordingly, the management communication processing unit 4 transmits the destination information response packet 204 for notifying that the destination being inquired about (the terminal device 111) is connected to the gateway device 101, through the first communication unit 5, to the gateway device 100 that has transmitted the destination information query packet 201.

On the other hand, if the terminal information storage table has an entry including information on the destination being inquired about by the destination information query packet 201, the terminal search processing unit 3 does not perform a terminal search, and the management communication processing unit 4 transmits the destination information response packet 204 through the first communication unit 5 to the gateway device 100.

In the gateway device 100, the first communication unit 5 receives the destination information response packet 204.

The first communication unit 5 forwards the destination information response packet 204 to the management communication processing unit 4.

Based on the destination information response packet 204, the management communication processing unit 4 registers in the terminal information storage table that the gateway device 101 and the terminal device 111 are connected, and invokes the relay processing unit 2.

The relay processing unit 2 transfers the packet 200 to the gateway device 101 based on the destination information (connection relation between the gateway device 101 and the terminal device 111) which has been newly registered in the terminal information storage table.

The relay processing unit 2 encapsulates the packet 200 for the dedicated communication network into the packet 205 for the general-purpose network 120, and transmits by unicasting the packet 205 through the first communication unit 5 to the gateway device 101.

In the gateway device 101, the first communication unit 5 receives the packet 205.

The first communication unit 5 forwards the packet 205 to the relay processing unit 2.

The relay processing unit 2 retrieves (decapsulates) the packet 200 for the dedicated communication network which is stored in the packet 205 received from the general-purpose network 120.

Then, the relay processing unit 2 looks for an entry that matches the destination information of the packet 200 in the terminal information storage table.

If there is an entry that matches the destination information of the packet 200, the relay processing unit 2 transmits the packet 200 to the network 122 in accordance with the entry information.

The terminal device 111 receives the packet 200, and communication from the terminal device 110 to the terminal device 111 is established.

Thereafter, a packet from the terminal device 110 to the terminal device 111 is relayed using the registered entry information in the terminal information storage table in each of the gateway device 100 and the gateway device 101, allowing the packet to be relayed without performing management communication using the packets 201 to 204.

Figure 4:
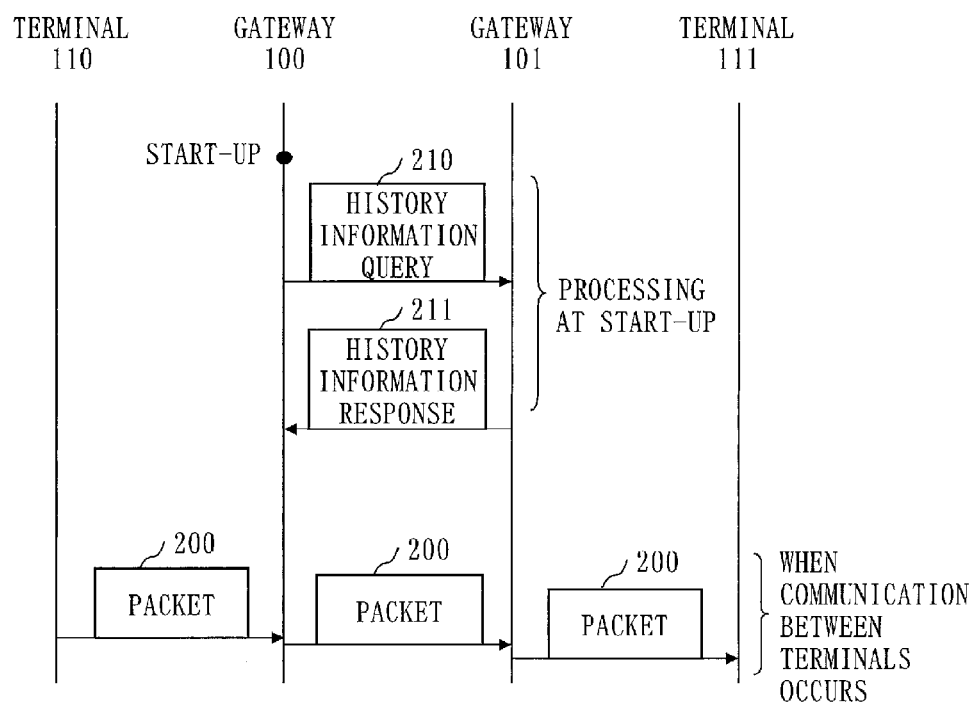
FIG. 4 is a diagram illustrating an example of a communication sequence in the communication system according to the first embodiment.

With reference to FIG. 1, FIG. 2, and FIG. 4, a description will now be directed to an example of the operation when the gateway device 100 is restarted after the relaying between the terminals of FIG. 3 has been conducted.

FIG. 4 is a sequence diagram representing communication to be performed at start-up of the gateway device 100 according to this embodiment.

In FIG. 4, a packet 200 and a packet 205 are substantially the same as those illustrated in FIG. 3.

A packet 210 is a history information query packet that is transmitted by the gateway device 100.

A packet 211 is a history information response packet that is transmitted by the gateway device 101.

It is assumed that the gateway device 100 has now restarted.

The gateway device 100 is started in a state in which various tables including the terminal information storage table which had been learned before restarting have been cleared (erased).

After having started, the gateway device 100 notifies the history information exchange unit 11 that the device has started.

Upon receiving this notification, the history information exchange unit 11 transmits by broadcasting or multicasting the history information query packet 210 through the first communication unit 5 to the connected general-purpose network 120.

The history information query packet 210 transmitted to the network 120 is received by the gateway device 101.

In the gateway device 101, the first communication unit 5 receives the history information query packet 210.

The first communication unit 5 forwards the history information query packet 210 to the history information exchange unit 11.

The history information exchange unit 11 in the gateway device 101 checks the terminal information exchange history storage unit 10 about a history information query from the gateway device 100 that has transmitted the history information query packet 210.

As a result of checking, if there is a terminal information exchange history for the gateway device 100 (information associating the gateway device 100 with the terminal device 111), the history information exchange unit 11 in the gateway device 101 stores this terminal information exchange history in the history information response packet 211.

Then, the history information exchange unit 11 transmits the history information response packet 211 through the first communication unit 5 to the gateway device 100.

In the gateway device 100, the first communication unit 5 receives the history information response packet 211.

The first communication unit 5 forwards the history information response packet 211 to the history information exchange unit 11.

The history information exchange unit 11 stores in the terminal information storage table the terminal information (information on the terminal device 111) stored in the history information response packet 211 and the information on the gateway device 101 that has transmitted the history information response packet 211.

With the above procedure, the gateway device 100 can restore the terminal information storage table in a state before restarting.

As illustrated in FIG. 7, when the gateway device 102 is also connected to the network 120, the gateway device 100 can restore the terminal information storage table in the state before restarting by conducting substantially the same procedure with the gateway device 102.

Thereafter, when the packet 200 from the terminal device 110 to the terminal device 111 is transmitted, for example, the gateway device 100 has been able to restore the terminal information storage table and thus can immediately relay the packet 200 using the entry information in the restored terminal information storage table.

For this reason, there is no need to perform management communication using the packets 201 to 204 illustrated in FIG. 3.

That is, after the terminal information storage table in the state before restarting has been restored, communication between the terminals is performed in an optimized state.

On the other hand, if the history information query of FIG. 4 has not been conducted, when the terminal device 110 transmits a packet to the terminal device 111, the gateway device 100 performs the terminal information query procedure (FIG. 3) by the management communication processing unit 4 because the terminal information storage table has been cleared.

Performing the terminal information query by the management communication processing unit 4 involves a broadcast transmission or a multicast transmission of the destination information query packet 201 to the network 120, consuming the bandwidth of the network 120.

Performing the terminal information query by the management communication processing unit 4 also consumes the CPU resources of the gateway devices, leading to a delay in relaying of the packet.

The bandwidth consumption and the resources consumption increase with the packet communication amount, imposing a burden on the network.

Without the history information query of FIG. 4, when the gateway device 100 receives a packet to the terminal device 111 from the terminal device 110 in the configuration of FIG. 7, the gateway device 100 transmits by broadcasting or multicasting the destination information query packet 201 to the network 120. Further, when the gateway device 100 receives a packet to the terminal device 112 from the terminal device 110, the gateway device 100 transmits by broadcasting or multicasting the destination information query packet 201 to the network 120.

In this way, without the history information query of FIG. 4, when the terminal device 110 needs to transmit packets to an n number of external terminal devices, the n number of broadcast transmissions or multicast transmissions are required.

It is envisaged that a large number of terminal devices are connected in an actual communication system. Thus, restoring the terminal information storage table requires a very large number of broadcast transmissions or multicast transmissions.

With the history information query of FIG. 4, the terminal information storage table can be restored with a single broadcast transmission or multicast transmission of the history information query packet 210.

In the above, a case where the gateway device is restarted has been described. The above description also applies to a case where the gateway device is replaced due to a failure or the like and the same ID is set in another gateway device which is then connected and started at the same location on the network.

For example, in a case where the gateway device 100 is disconnected from the network 120 and the network 121 and a new gateway device is connected to the network 120 and the network 121 as a replacement, the new gateway device transmits by broadcasting or multicasting the history information query packet 210 to the network 120, receives the history information response packet 211 from the gateway device 101, and restores the terminal information storage table of the gateway device 100 using the received history information response packet 211.

The internal configuration of the new gateway device is also substantially the same as the internal configuration of the gateway device 100 illustrated in FIG. 1.

As described above, in this embodiment, when the gateway device is restarted or replaced, only terminal information having an exchange history is exchanged between the gateway devices based on the terminal information exchange history.

For this reason, when the gateway device is restarted or replaced, network bandwidth consumption and CPU resources consumption can be restrained.

Further, with the history information query procedure (FIG. 4), the destination information query procedure (FIG. 3) can be omitted when a packet communication between the terminal devices occurs, so that a delay in relaying can be restrained.

In this embodiment, the gateway device having the following functions has been described.

(1) The gateway device holds a terminal information exchange history with another gateway device.

(2) At start-up of the device, the gateway device requests another gateway device to provide terminal information based on the history, obtains the terminal information, and restores a relay table for registering a relay destination gateway device based on each piece of the terminal information.

(3) In response to a request for terminal information based on the history, the gateway device returns the terminal information based on the terminal information exchange history.

Second Embodiment

The first embodiment above has described the communication system in which the destination information query packet 201 and the destination information response packet 204 are transmitted and received, as illustrated in FIG. 3.

This embodiment describes a communication system in which the destination information query packet 201 and the destination information response packet 204 are not used.

Figure 8:
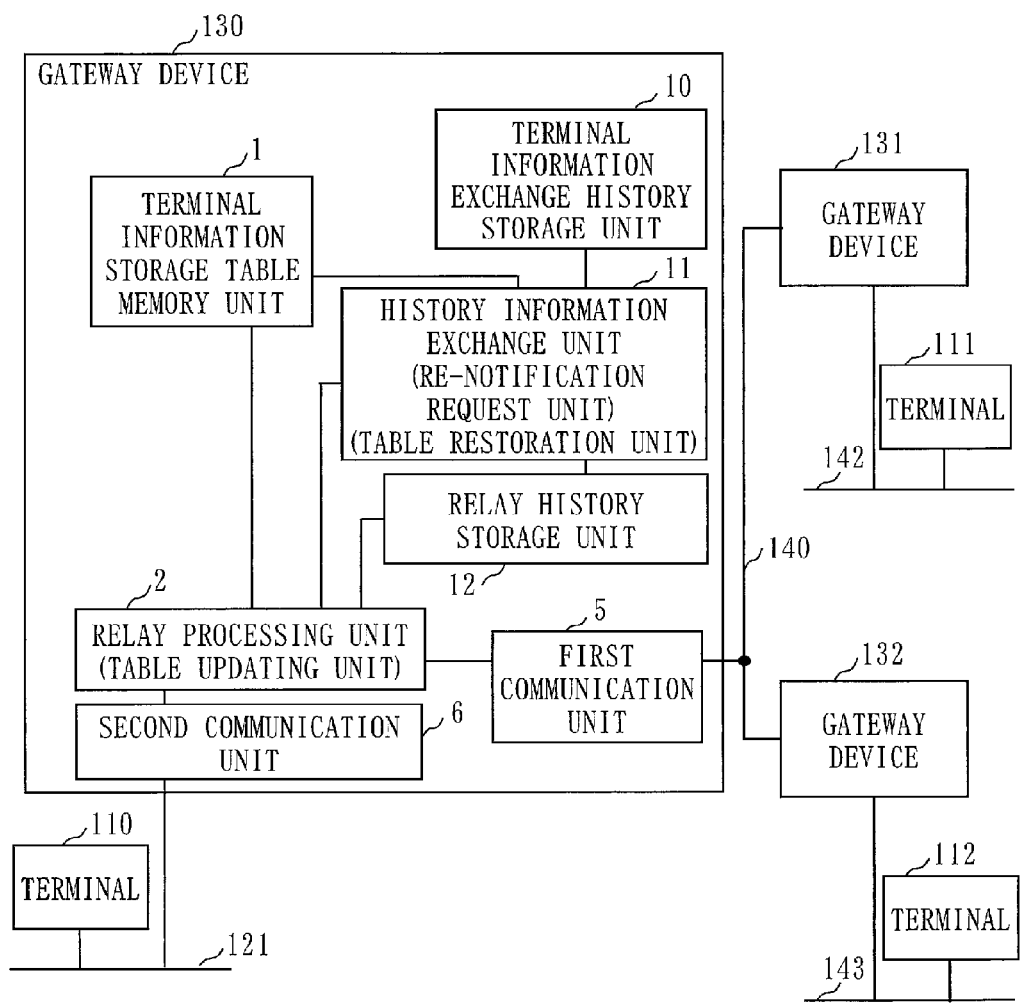
FIG. 8 is a diagram illustrating an example of the configuration of a gateway device according to a second embodiment.
Figure 9:
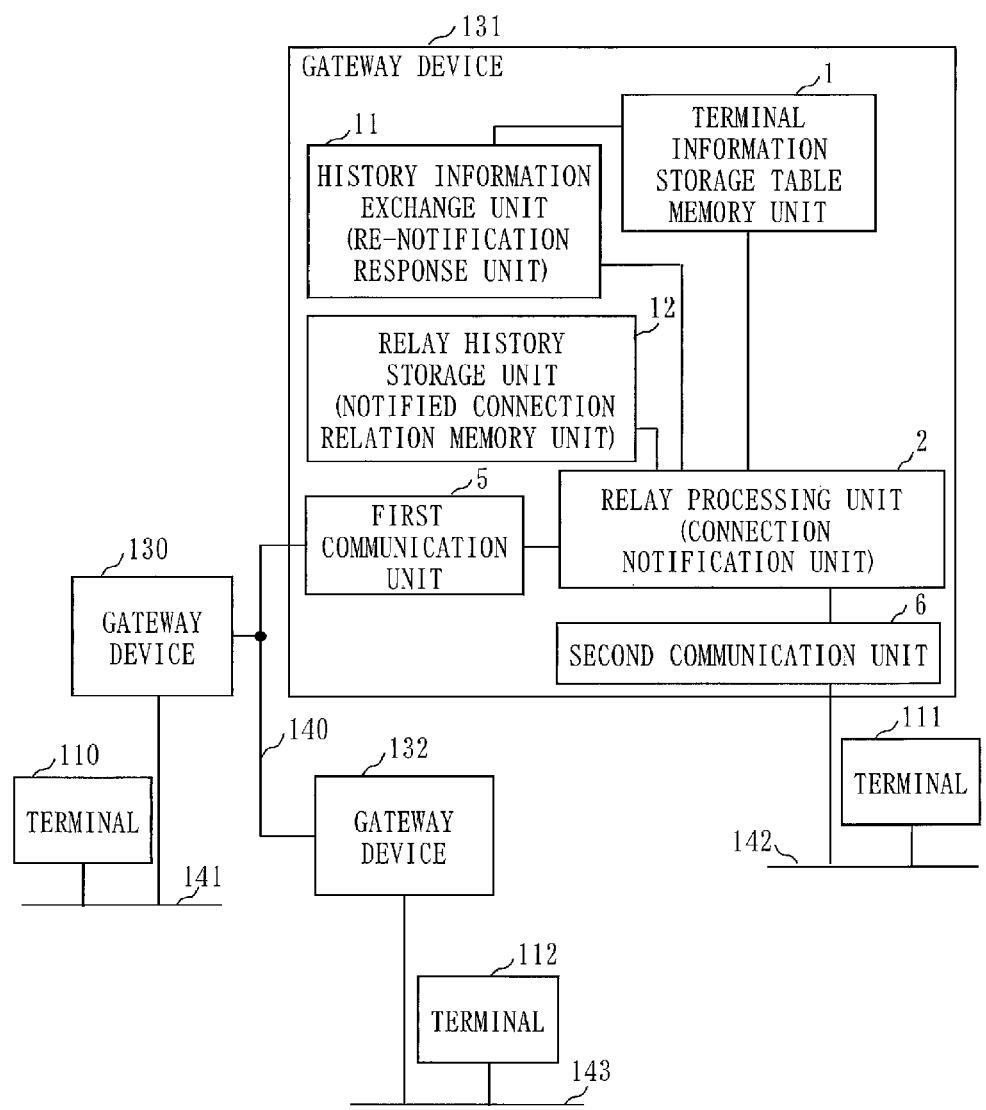
FIG. 9 is a diagram illustrating an example of the configuration of a gateway device according to the second embodiment.

FIG. 8 and FIG. 9 illustrate the communication system according to this embodiment.

Similarly to the first embodiment, FIG. 8 illustrates an example of the internal configuration of a gateway device 130 to describe the operation of the gateway device 130, and FIG. 9 illustrates an example of the internal configuration of a gateway device 131 to describe the operation of the gateway device 131.

The gateway device 130 is a gateway device which serves in substantially the same manner as the gateway device 100 of FIG. 1, the gateway device 131 is a gateway device which serves in substantially the same manner as the gateway device 101 of FIG. 2, and a gateway device 132 is a gateway device which serves in substantially the same manner as the gateway device 102 of FIG. 7.

The gateway device 130, the gateway device 131, and the gateway device 132 have the same internal configuration.

Differences from the first embodiment will be mainly described hereinafter.

In FIG. 8 and FIG. 9, a network 140 is a general-purpose network, and is substantially the same as the network 120 in the first embodiment.

Networks 141, 142, and 143 are dedicated communication networks, and are substantially the same as the networks 121, 122, and 123 in the first embodiment.

The terminal devices 110, 111, and 112 are substantially the same as those presented in the first embodiment.

In FIG. 8 and FIG. 9, the terminal information storage table memory unit 1, the first communication unit 5, the second communication unit 6, and the history information exchange unit 11 are substantially the same as those presented in the first embodiment.

Therefore, also in this embodiment, the history information exchange unit 11 in the gateway device 130 corresponds to an example of the re-notification request unit and the table restoration unit.

The history information exchange unit 11 in the gateway device 131 also corresponds to an example of the re-notification response unit.

In this embodiment, management communication using the destination information query packet 201 and the destination information response packet 204 is not performed. Thus, the terminal search processing unit 3, the management communication processing unit 4, and the terminal information exchange history storage unit 10 which are described in the first embodiment do not exist.

In this embodiment, management communication is not performed. Instead, the relay processing unit 2 in the gateway device 130 broadcasts or multicasts to the network 140 a packet received from the terminal device 110 and destined to the terminal device 111.

Then, the relay processing unit 2 updates the terminal information storage table using a response packet from the network 140 in response to the broadcast or multicast packet.

In this embodiment, the relay processing unit 2 in the gateway device 130 corresponds to an example of the table updating unit.

The relay processing unit 2 in the gateway device 131 broadcasts or multicasts to the network 142 a packet from the gateway device 130.

Then, the relay processing unit 2 adds information that the terminal device 111 is connected to the gateway device 131 to a response packet from the network 142 in response to the broadcast or multicast packet, and transmits this response packet to the gateway device 130.

In this embodiment, the relay processing unit 2 in the gateway device 131 corresponds to an example of the connection notification unit.

A relay history storage unit 12 saves a history of relaying a packet which is transmitted from another gateway device.

In this embodiment, the history information exchange unit 11 generates a history information response packet using the history saved in the relay history storage unit 12, and transmits the generated history information response packet to the gateway device 130.

Figure 10:
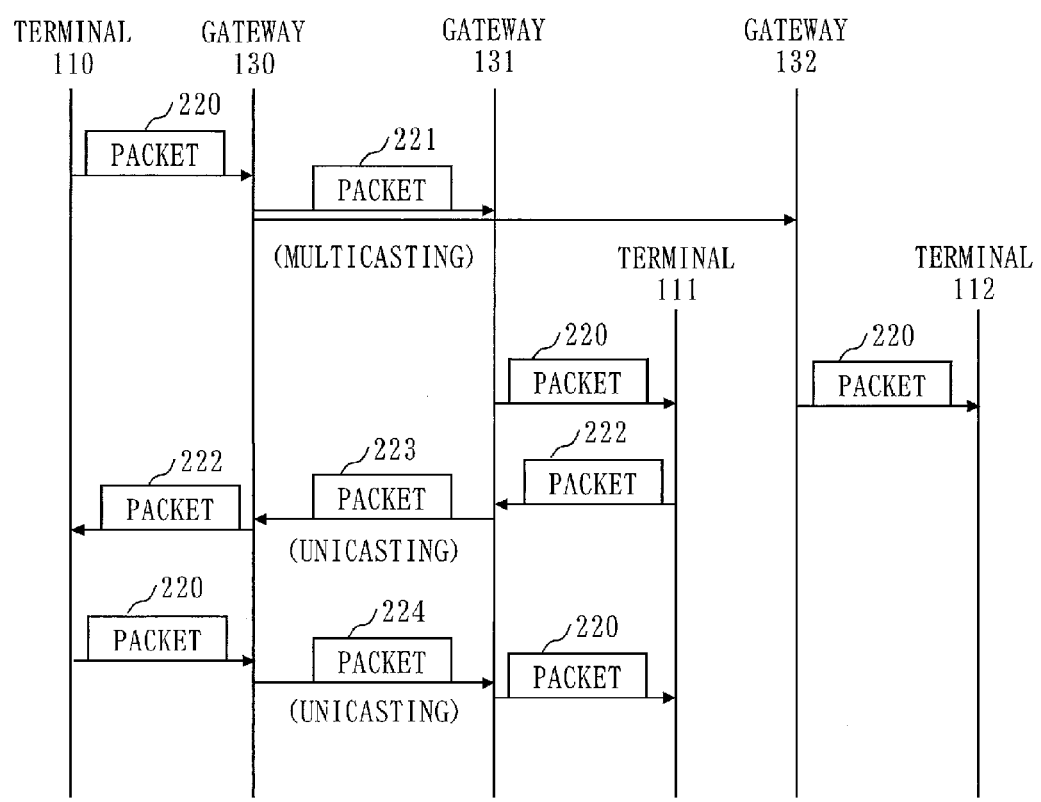
FIG. 10 is a diagram illustrating an example of a communication sequence in a communication system according to the second embodiment.

FIG. 10 is a communication sequence diagram in the communication system according to this embodiment.

In FIG. 10, a packet 220 is a packet that is transmitted from the terminal device 110 to the terminal device 111.

A packet 221 is a packet that is created by encapsulating the packet 220 so as to be sent through the general-purpose network.

A packet 222 is a packet that is transmitted from the terminal device 111 to the terminal device 110.

A packet 223 is a packet that is created by encapsulating the packet 222 so as to be sent through the general-purpose network.

A packet 224 is a packet that is created by encapsulating the packet 220 so as to be sent through the general-purpose network.

The operation will now be described.

First, a method for building the terminal information storage table of the gateway device according to this embodiment will be described with reference to FIG. 8 to FIG. 10.

The terminal device 110 being connected to the gateway device 130 transmits the packet 220 for the dedicated communication network which is destined to the terminal device 111.

In the gateway device 130, the second communication unit 6 receives the packet 220, and forwards the packet 220 to the relay processing unit 2.

The relay processing unit 2 looks for an entry (record) that matches the destination information of the packet 220 in the terminal information storage table.

In there is no entry (record) that matches the destination information of the packet 220, the relay processing unit 2 relays the packet 220 to the network 140 being connected to the interface (the first communication unit 5) which is different from the interface that has received the packet 220 (the second communication unit 6).

The relay processing unit 2 encapsulates the packet 220 for the dedicated communication network into the packet 221 for the general-purpose network, and transmits by multicasting or broadcasting the packet 221 through the first communication unit 5.

The reason for using multicasting or broadcasting is that the gateway device 130 does not hold the information on the terminal device 111 in the terminal information storage table at this point, so that flooding is carried out on the network 140.

The packet 220 that is transmitted by multicasting or broadcasting from the relay processing unit 2 corresponds to an example of the investigation packet.

At this time, the relay processing unit 2 in the gateway device 130 stores the information on the terminal device 110 as the source information of the packet 220 in the terminal information storage table, together with the information on the interface that has received the packet 220 (the second communication unit 6).

In the gateway device 131, the first communication unit 5 receives the packet 221.

Then, the first communication unit 5 forwards the packet 221 to the relay processing unit 2.

The relay processing unit 2 retrieves (decapsulates) the packet 220 for the dedicated communication network which is stored in the packet 221 received from the general-purpose network 140.

The relay processing unit 2 also looks for an entry that matches the destination information of the packet 220 in the terminal information storage table.

If there is no entry that matches the destination information of the packet 220, the relay processing unit 2 transmits by broadcasting or multicasting the packet 220 to the network 142 being connected to the interface (the second communication unit 6) which is different from the interface that has received the packet 220 (the first communication unit 5).

At this time, the relay processing unit 2 in the gateway device 131 stores the information on the terminal device 110 as the source information of the packet 220 in the terminal information storage table, together with the information on the interface that has received the packet 221 (the first communication unit 5) and the information on the gateway device 130 that has transmitted the packet 221.

At this stage, the terminal information on the terminal device 110 that has transmitted the packet 200 has been registered in the terminal information storage table in each of the gateway device 130 and the gateway device 131.

Because the gateway device 132 is also connected to the network 140, the gateway device 132 receives the packet 221, performs substantially the same operation as the gateway device 131, and transmits the packet 220 to the network 143. However, the destination terminal device does not exist, so that the packet 220 is not received by any terminal device.

The terminal device 111 being connected to the network 142 receives the above packet 220, and communication from the terminal device 110 to the terminal device 111 is established.

A case where the terminal device 111 transmits the packet 222 to the terminal device 110 in this state will be described.

The packet 222 transmitted by the terminal device 111 is received by the second communication unit 6 in the gateway device 131.

The second communication unit 6 forwards the packet 222 to the relay processing unit 2.

The relay processing unit 2 finds in the terminal information storage table the entry that matches the destination information of the terminal device 110 to which the packet 222 is destined, and relays the packet 222 to the gateway device 130 in accordance with the content registered in this entry.

The relay processing unit 2 encapsulates the packet 222 for the dedicated communication network into the packet 223 for the general-purpose network, and transmits by unicasting the packet 223 through the first communication unit 5 to the gateway device 130.

In encapsulating the packet 222, the relay processing unit 2 adds an ID of the gateway device 131 to the header part of the packet 223 as the source of the packet 223.

That is, the relay processing unit 2 adds to the packet 222 the information that the terminal device 111 that has transmitted the packet 222 is connected to the gateway device 131.

In this sense, the packet 223 corresponds to an example of the connection notification packet.

At this time, the relay processing unit 2 in the gateway device 131 stores the information on the terminal device 111 as the source information of the packet 222 in the terminal information storage table, together with the information on the interface that has received the packet 222 (the second communication unit 6).

In the gateway device 130, the first communication unit 5 receives the packet 223.

The first communication unit 5 forwards the packet 223 to the relay processing unit 2.

The relay processing unit 2 retrieves (decapsulates) the packet 222 which is stored in the packet 223.

Then, as a result of looking into the terminal information storage table, the relay processing unit 2 finds the entry that matches the destination information of the terminal device 110 to which the packet 222 is destined, and transmits the packet 222 to the terminal device 110 through the interface being connected to the network 141 (the second communication unit 6) in accordance with the content registered in this entry.

At this time, the relay processing unit 2 in the gateway device 130 stores the information on the terminal device 111 as the source information of the packet 222 in the terminal information storage table, together with the information on the interface that has received the packet 223 (the first communication unit 5) and the information on the gateway device 131 that has transmitted the packet 223.

At this stage, the terminal information on the terminal device 111 that has transmitted the packet 222 has been registered in the terminal information storage table in each of the gateway device 130 and the gateway device 131.

The terminal device 110 being connected to the network 141 receives the above packet 222, and communication from the terminal device 111 to the terminal device 110 is established.

In this way, each gateway device learns terminal information dynamically through the packet relay operation between the terminals and builds the terminal information storage table.

The operation when a packet is relayed after the terminal information storage table has been built will now be described.

When the packet 220 to the terminal device 111 is transmitted from the terminal device 110, the second communication unit 6 receives the packet 220 in the gateway device 130.

The second communication unit 6 forwards the packet 220 to the relay processing unit 2.

The relay processing unit 2 looks for an entry that matches the destination information of the packet 220 in the terminal information storage table.

Because the entry that matches the destination information of the packet 220 exists, the relay processing unit 2 relays the packet 220 to the gateway device 131 in accordance with the content registered in this entry.

Also in this case, the relay processing unit 2 encapsulates the packet 220 into the packet 224 for the general-purpose network, and transmits by unicasting the packet 224 to the gateway device 131.

In the gateway device 131, the first communication unit 5 receives the packet 224.

The first communication unit 5 forwards the packet 224 to the relay processing unit 2.

The relay processing unit 2 retrieves the packet 220 which is stored in the packet 224.

Then, the relay processing unit 2 refers to the terminal information storage table and looks for an entry that matches the destination information of the packet 220.

As a result, the entry that matches the destination information of the packet 220 is found. Because the information on the interface being connected to the network 142 is stored in this entry, the relay processing unit 2 relays the packet 220 to the network 142.

At this time, on the conditions that the packet is received from the general-purpose network and that the packet is relayed to the dedicated communication network, the information on the gateway device 130 and the destination information of the relayed packed 220 (information on the terminal device 111) are stored in the relay history storage unit 12.

The terminal device 111 being connected to the network 142 receives the packet 220, and communication from the terminal device 110 to the terminal device 111 is established.

Figure 11:
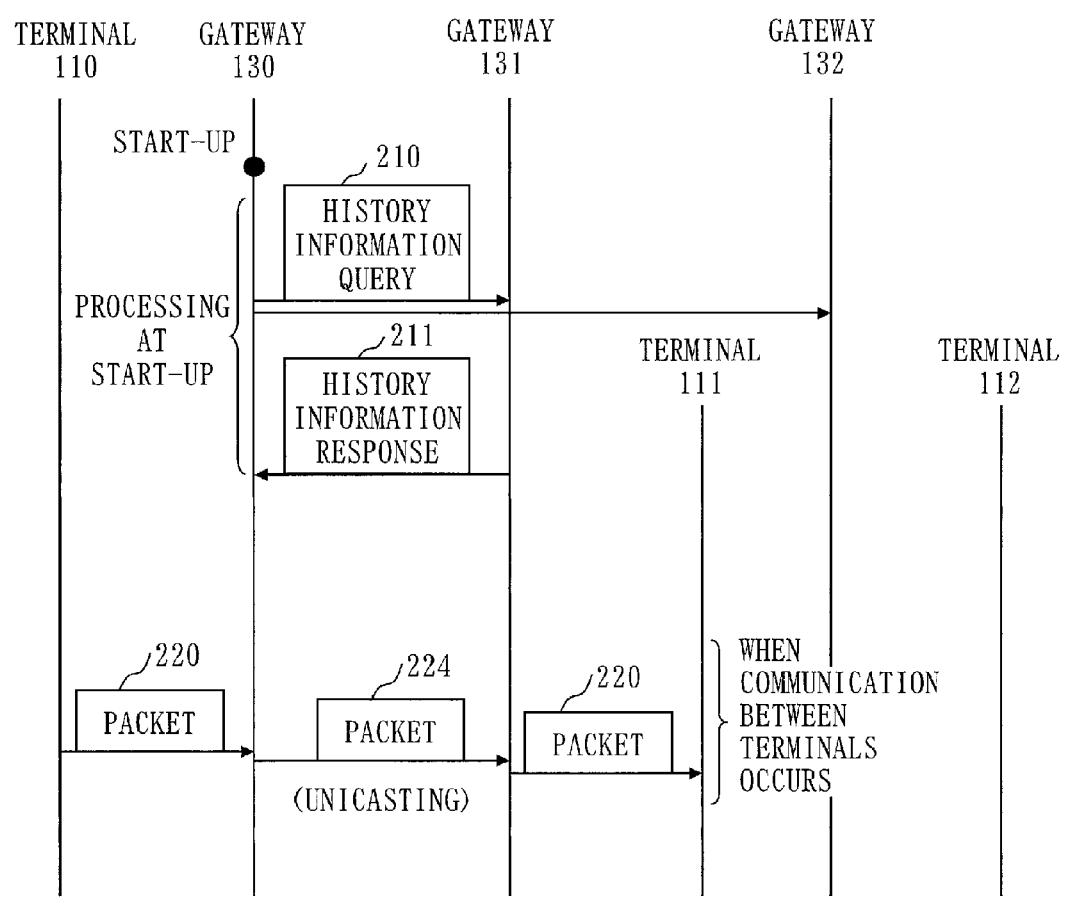
FIG. 11 is a diagram illustrating an example of a communication sequence in the communication system according to the second embodiment.

With reference to FIG. 8, FIG. 9, and FIG. 11, a description will now be directed to an example of the operation when the gateway device 130 is restarted after the relaying between the terminals of FIG. 10 has been conducted and the terminal information storage table has been built in each gateway device.

FIG. 11 is a sequence diagram representing communication to be performed at start-up of the gateway device 130.

In FIG. 11, a packet 220 and a packet 224 are substantially the same as those illustrated in FIG. 10.

A packet 210 is a history information query packet that is transmitted by the gateway device 100.

The history information query packet 210 corresponds to an example of the re-notification request packet also in this embodiment.

A packet 211 is a history information response packet that is transmitted by the gateway device 101.

The history information response packet 211 corresponds to an example of the re-notification response packet also in this embodiment.

It is assumed that the gateway device 130 has now restarted.

The gateway device 130 is started in a state in which various tables including the terminal information storage table which had been learned before restarting have been cleared (erased).

After having started, the gateway device 130 notifies the history information exchange unit 11 that the device has started.

Upon receiving this notification, the history information exchange unit 11 transmits by broadcasting or multicasting the history information query packet 210 through the first communication unit 5 to the connected general-purpose network 140.

The history information query packet 210 transmitted to the network 140 is received by the gateway device 131.

In the gateway device 131, the first communication unit 5 receives the history information query packet 210.

The first communication unit 5 forwards the history information query packet 210 to the history information exchange unit 11.

The history information exchange unit 11 in the gateway device 131 checks the relay history storage unit 12 about a history information query from the gateway device 130 that has transmitted the history information query packet 210.

As a result of checking, if there is a relay history on the gateway device 130 (information associating the gateway device 130 with the terminal device 111), the history information exchange unit 11 in the gateway device 131 stores this relay history in the history information response packet 211.

Then, the history information exchange unit 11 transmits the history information response packet 211 through the first communication unit 5 to the gateway device 130.

In the gateway device 130, the first communication unit 5 receives the history information response packet 211.

The first communication unit 5 forwards the history information response packet 211 to the history information exchange unit 11.

The history information exchange unit 11 stores in the terminal information storage table the terminal information (information on the terminal device 111) stored in the history information response packet 211 and the information on the gateway device 131 that has transmitted the packet 211.

With the above procedure, the gateway device 130 can restore terminal information on each destination to which relaying has been actually performed, out of the content of the terminal information storage table in the state before restarting.

When the gateway device 132 is also connected to the network 140, the gateway device 130 can restore terminal information on each destination to which relaying has been actually performed, out of the content of the terminal information storage table in the state before restarting, by conducting substantially the same procedure with the gateway device 132.

Thereafter, when the packet 200 to the terminal device 111 is transmitted from the terminal device 110, for example, the gateway device 130 has been able to restore the terminal information storage table and thus can immediately relay the packet 220 using the entry information in the restored terminal information storage table.

For this reason, there is no need to perform communication by multicasting or broadcasting as illustrated in FIG. 10.

On the other hand, if the history information query of FIG. 11 has not been conducted, when the terminal device 110 transmits a packet to the terminal device 111, the gateway device 130 relays the packet to the network 140 by broadcasting or multicasting because the terminal information storage table has been cleared.

For this reason, the gateway device 132 which is not connected to the terminal device 111 also receives the packet.

Thus, the gateway device 132 receives the unnecessary packet, consuming the CPU resources.

The unnecessary packet is also transferred through the network 142 and the network 143, causing unnecessary bandwidth consumption.

Further, if the network 142 and the network 143 are configured with L2 switches, a unicast packet is relayed only to a necessary segment, whereas a multicast or broadcast packet is relayed to all segments, causing unnecessary bandwidth consumption.

In the above, a case where the gateway device is restarted has been described. The above description also applies to a case where the gateway device is replaced due to a failure or the like and the same ID is set in another gateway device which is then connected and started at the same location on the network.

For example, when a new gateway device is connected to the network 140 and the network 141 in place of the gateway device 130, the new gateway device transmits by broadcasting or multicasting the history information query packet 210 to the network 140, receives the history information response packet 211 from the gateway device 131, and restores the terminal information storage table of the gateway device 130 using the received history information response packet 211.

The internal configuration of the new gateway device is also substantially the same as the internal configuration of the gateway device 130 illustrated in FIG. 8.

As described above, in this embodiment, when the gateway device is restarted or replaced, only terminal information having a history is exchanged between the gateway devices based on the communication relay history between the terminals before restarting.

For this reason, when the gateway device is restarted or replaced, network bandwidth consumption and CPU resources consumption can be restrained.

In this embodiment, the gateway device having the following functions has been described.

(1) The gateway device holds a relay history of a packet which is transmitted from another gateway device and is destined to a terminal being connected to the gateway device itself.

(2) At start-up of the device, the gateway device requests another gateway device to provide terminal information based on the history, obtains the terminal information, and restores a relay table for registering a relay destination gateway based on each piece of the terminal information.

(3) In response to a request for terminal information based on the history, the gateway device returns the terminal information based on the relay history.

Third Embodiment

The first embodiment above has described the procedure in which the gateway device that is restarted obtains the information on a terminal device being connected to another gateway device and restores the terminal information storage table.

This embodiment describes a procedure in which the gateway device that is restarted obtains the information on a terminal device being connected to this gateway device and restores the terminal information storage table.

Figure 12:
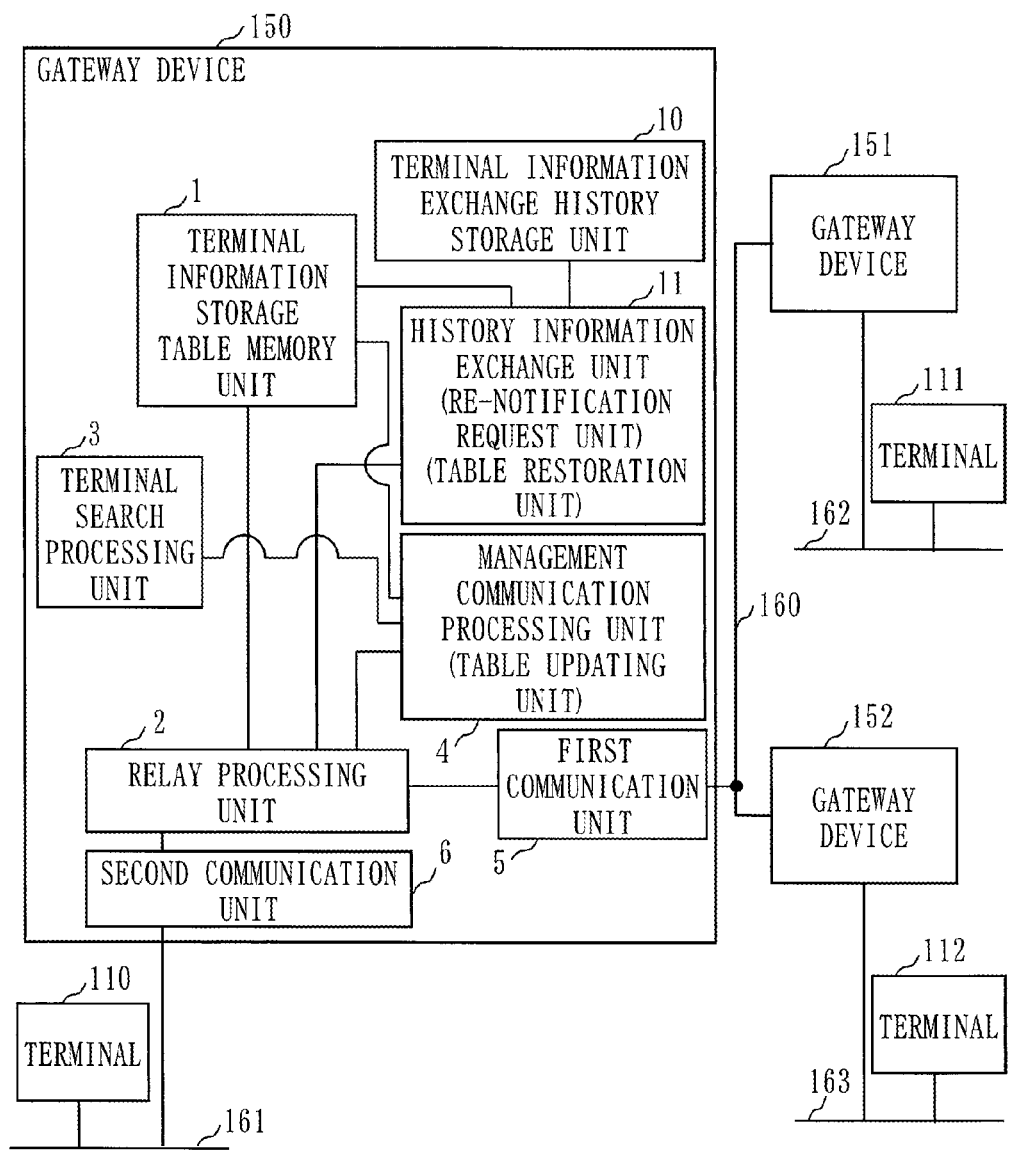
FIG. 12 is a diagram illustrating an example of the configuration of a gateway device according to a third embodiment.
Figure 13:
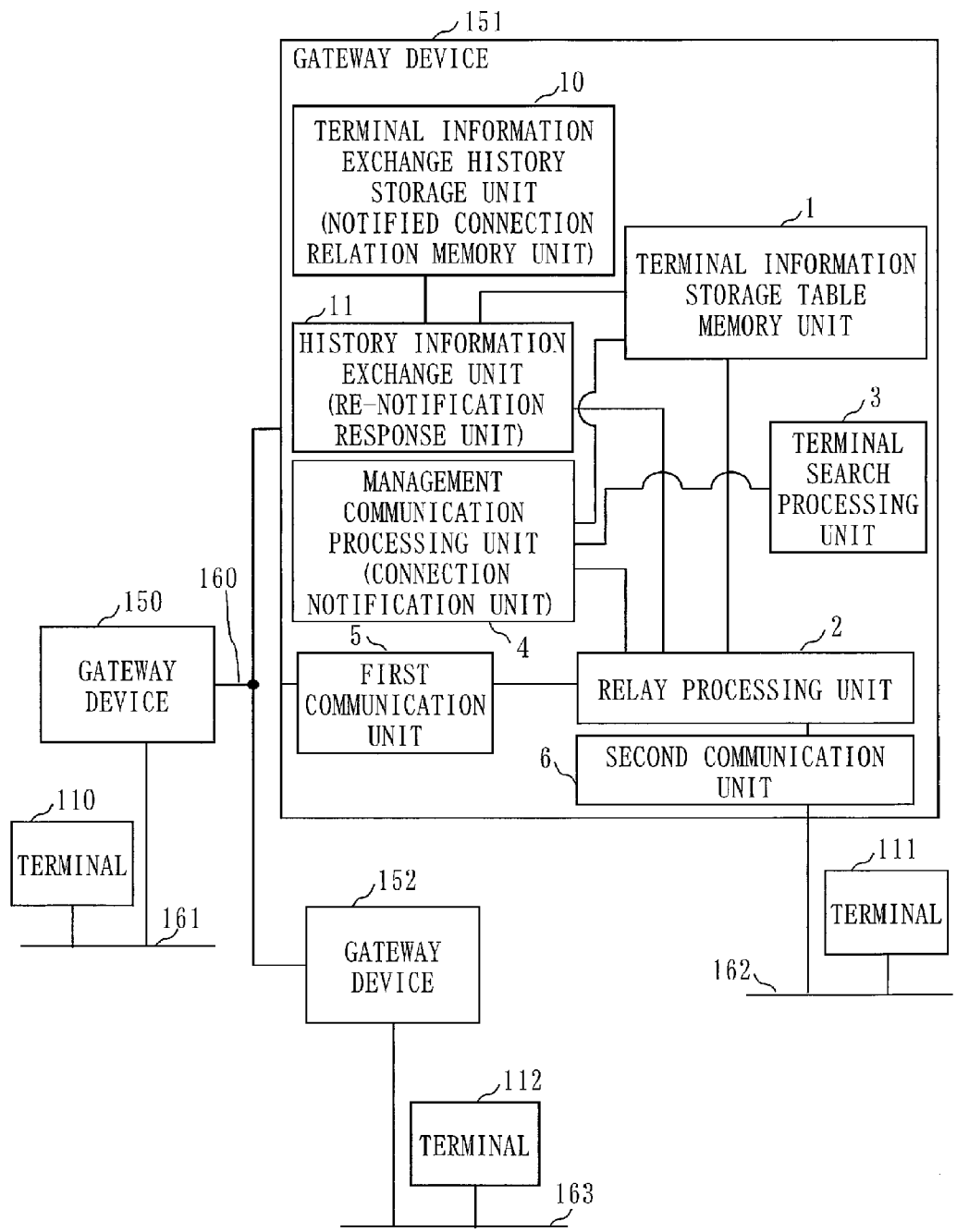
FIG. 13 is a diagram illustrating an example of the configuration of a gateway device according to the third embodiment.

FIG. 12 and FIG. 13 illustrate a communication system according to this embodiment.

Similarly to the first embodiment, FIG. 12 illustrates an example of the internal configuration of a gateway device 150 to describe the operation of the gateway device 150, and FIG. 13 illustrates an example of the internal configuration of a gateway device 151 to describe the operation of the gateway device 151.

The gateway device 150 is a gateway device which serves in substantially the same manner as the gateway device 100 of FIG. 1, the gateway device 151 is a gateway device which serves in substantially the same manner as the gateway device 151 of FIG. 2, and a gateway device 152 is a gateway device which serves in substantially the same manner as the gateway device 102 of FIG. 7.

The gateway device 150, the gateway device 151, and the gateway device 152 have the same internal configuration.

The internal configuration of the gateway device 150 and the gateway device 151 is substantially the same as that of the gateway device 100 and the gateway device 101, and will not be described.

Differences from the first embodiment will be mainly described hereinafter.

In FIG. 12 and FIG. 13, networks 160, 161, 162, and 163 are substantially the same as the networks 120, 121, 122, and 123 presented in the first embodiment.

The terminal device 110, 111, and 112 are substantially the same as those presented in the first embodiment.

However, in this embodiment, the terminal device 111 is a master terminal device, and the terminal device 110 and the terminal device 112 are slave terminal devices.

The master terminal device 111 communicates with each of the salve terminal devices 110 and 112, and controls and monitors each of the terminal devices 110 and 112.

For this reason, the gateway device 151 performs relaying between the terminal device 111 and the terminal device 110 and relaying between the terminal device 111 and the terminal device 112. In the terminal information storage table of the gateway device 151, the information associating the terminal device 110 with the gateway device 150 and the information associating the terminal device 112 with the gateway device 152 have been registered.

The gateway device 151 corresponds to an example of a specific relay device.

This embodiment envisages a system in which communication between the terminals is mostly communication between the master terminal device 111 and each of the slave terminal devices 110 and 112, and communication between the slave devices is not performed or communication is performed only between some of the slave devices.

The operation will now be described.

In the configuration as illustrated in FIG. 12 and FIG. 13, the gateway device 150 accommodating the terminal device 110, the gateway device 151 accommodating the terminal device 111, and the gateway device 152 accommodating the terminal device 112 each build the terminal information storage table with substantially the same procedure as described in the first embodiment.

That is, the terminal information storage table of the gateway device 150 holds the terminal information on the terminal device 111 together with the information on the gateway device 151.

The terminal information storage table of the gateway device 151 holds the terminal information on the terminal device 110 together with the information on the gateway device 150, and also holds the terminal information on the terminal device 112 together with the information on the gateway device 152.

The terminal information storage table of the gateway device 152 holds the terminal information on the terminal device 110 together with the information on the gateway device 150.

Therefore, communication can be performed between the terminal device 111 and the terminal device 110 and between the terminal device 111 and the terminal device 112 in an optimized state in both directions.

Figure 14:
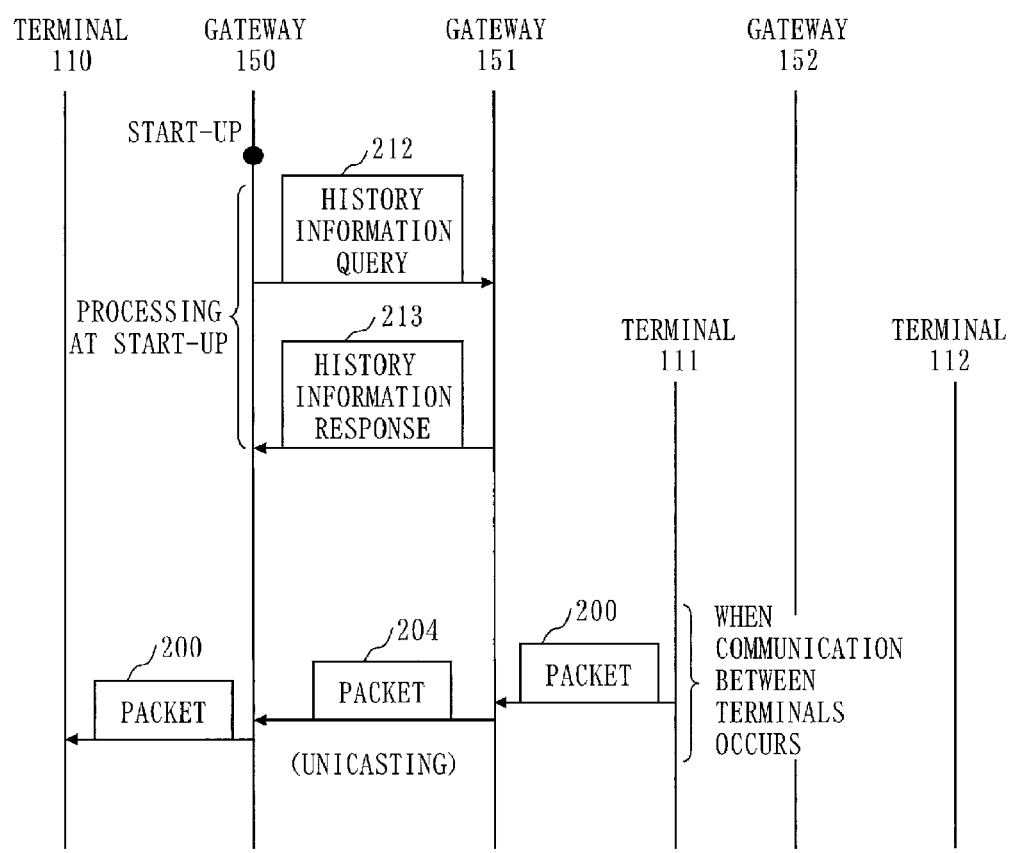
FIG. 14 is a diagram illustrating an example of a communication sequence in a communication system according to the third embodiment.

With reference to FIGS. 12 to 14, a description will be directed to an example of the operation when the gateway device 150 is restarted after the terminal information storage table has been built in each gateway device.

FIG. 14 is a sequence diagram representing communication to be performed at start-up of the gateway device 150.

In FIG. 14, a packet 200 and a packet 204 are substantially the same as those presented in the second embodiment.

A packet 212 is a registration information query packet.

The registration information query packet 212 is a packet for requesting the gateway device 151 to which the master terminal device 111 is connected to notify of the internal terminal device of the gateway device 150 that has been registered in the gateway device 151, and corresponds to an example of a terminal notification request packet.

A packet 213 is a registration information response packet.

The registration information response packet 213 is a packet that is transmitted from the gateway device 151 in response to the registration information query packet 212, and is a packet for notifying of the internal terminal device of the gateway device 150.

The registration information response packet 213 corresponds to an example of a terminal notification response packet.

Based on the registration information response packet 213, the gateway device 150 identifies that the terminal device 110 is connected to the gateway device 150 as the internal terminal device, and restores the terminal information storage table.

The gateway device 150 is started in a state in which various tables including the terminal information storage table which had been learned before restarting have been cleared (erased).

After having started, the gateway device 150 notifies the history information exchange unit 11 that the device has started.

Upon receiving this notification, the history information exchange unit 11 transmits by unicasting the registration information query packet 212 through the first communication unit 5 to the gateway device 151 to which the master terminal device 111 is connected.

In the gateway device 151, the first communication unit 5 receives the registration information query packet 212.

The first communication unit 5 forwards the registration information query packet 212 to the history information exchange unit 11.

The history information exchange unit 11 extracts from the terminal information storage table a record in which is written the gateway device 150 that has transmitted the registration information query packet 212, and stores the information on the terminal device written in the extracted record in the registration information response packet 213.

Then, the history information exchange unit 11 transmits the registration information response packet 213 through the first communication unit 5 to the gateway device 150.

At this time, the history information exchange unit 11 does not extract a record in which is written a gateway device other than the gateway device 150, for example the gateway device 152, from the terminal information storage table.

For this reason, the history information exchange unit 11 does not store the information on the internal terminal device of the gateway device 152 in the registration information response packet 213.

In the gateway device 150, the first communication unit 5 receives the registration information response packet 213.

The first communication unit 5 forwards the registration information response packet 213 to the history information exchange unit 11.

The history information exchange unit 11 obtains the terminal information (information on the terminal device 110) stored in the registration information response packet 213, and registers the terminal information in the terminal information storage table.

The interface information which is registered in the terminal information storage table together with the information on the terminal device 110 is the information on the interface (the second communication unit 6) which is connected to the dedicated communication network 161 being connected to the gateway device 150.

The terminal device 111 being accommodated in the gateway device 151 is the master terminal device, and the terminal information on each slave terminal device is registered in the terminal information storage table in the gateway device 151.

By registering the terminal information obtained from the gateway device 151 in the terminal information storage table of the gateway device decide 150, the gateway device 150 can restore the information, existing before restarting, on the terminal device of the network 161 in the terminal information storage table.

The gateway device 150 obtains only the terminal information relating to the gateway device 150, and thus is prevented from obtaining unnecessary terminal information.

Thereafter, when the packet 200 from the terminal device 111 to the terminal device 110 is transmitted, for example, the gateway device 150 has been able to restore the terminal information storage table and thus can immediately relay the packet 200 using the entry information in the restored terminal information storage table. Thus, there is no need to conduct a destination search.

That is, after the terminal information storage table in the state before restarting has been restored, communication between the terminals is performed in an optimized state.

On the other hand, if the history information query of FIG. 14 has not been conducted, when the terminal device 111 transmits a packet to the terminal device 110, the gateway device 150 performs a terminal search process (process corresponding to transmitting and receiving of the packet 202 and the packet 203 of FIG. 3) because the terminal information storage table has been cleared.

Performing the terminal search process consumes the bandwidth of the network 161 and also consumes the CPU resources of the gateway devices, leading to a delay in relaying of the packet.

The bandwidth consumption and the resources consumption increase with the packet communication amount, imposing a burden on the network.

In the above, a case where the gateway device is restarted has been described. The above description also applies to a case where the gateway device is replaced due to a failure or the like and another gateway device is connected and started at the same location on the network.

As described above, in this embodiment, the terminal information is restored when the gateway device is restarted or replaced, so that network bandwidth consumption can be restrained when relaying of a packet between the terminals is resumed.

When relaying of a packet between the terminals is resumed after restarting, the terminal search procedure can be omitted, so that CPU resources consumption can be restrained and a delay in relaying can be restrained.

An example has been described above in which the gateway device accommodating the master terminal device is already known to the gateway device that is restarted, and the registration information query packet 212 is transmitted by unicasting to the gateway device accommodating the master terminal device.

However, if the gateway device accommodating the master terminal device is not known to the gateway device that is restarted, the gateway device that is restarted broadcasts or multicasts the registration information query packet 212 to the network 160, and receives the registration information response packet 213 from all the gateway devices on the network 160.

An example has been described above in which the gateway device 150 accommodates the master terminal device 111. This embodiment can also be applied when the master terminal device is an integrated device having a gateway function.

The communication system in which the master terminal device exists has been described above. The technique presented in this embodiment can also be applied to a communication system in which the master terminal device does not exist.

When the master terminal device does not exists, the gateway device 150 that has restarted broadcasts or multicasts the registration information query packet 212 to the network 160, and receives the registration information response packet 213 from all the gateway devices on the network 160.

This embodiment has described the gateway device having the following functions.

(1) The information on the terminal being connected to each gateway device is exchanged and held between the gateway devices.

(2) At start-up of the device, the gateway device requests another gateway device to provide the terminal information registered by a notification from the gateway device itself, obtains the terminal information, and restores the terminal information as the information on the terminal being connected to the gateway device itself.

(3) In response to a request for terminal information, the gateway device returns the terminal information which has been registered by a notification from the requesting device.

This embodiment has also described that the gateway device included in the communication system connecting one master terminal device and a plurality of slave devices requests terminal information from the gateway device being connected to the master terminal device.

Fourth Embodiment

An example will be described hereinafter in which the configurations discussed in the first to third embodiments are applied to a network of an air-conditioning apparatus (to be referred to as an "air conditioner" hereinafter; "air-conditioning" means conditioning of air hereinafter).

In the fourth embodiment, a description will be provided assuming that all of the configurations and operations discussed in the first to third embodiments are included.

First, the terminal 110 illustrated in FIG. 7 and so on corresponds to an air-conditioning management control apparatus, and the terminal 111 and the terminal 112 each correspond to an air-conditioning outdoor unit or an air-conditioning indoor unit.

The air-conditioning management control apparatus manages and controls a plurality of air-conditioning outdoor units and a plurality of air-conditioning indoor units.

In the first to third embodiments, it is discussed that there may be a plurality of the terminal 110. When the first to third embodiments are applied to an air-conditioning management control apparatus, it is often the case that one terminal 110 is used.

In FIG. 1 and so on, the gateway device 101 is installed physically in the terminal 111 (air-conditioning outdoor unit) which is closest to the gateway device 101.

By arranging that another terminal 111 being connected to this gateway device 101 is used as an air-conditioning indoor unit, a layout which is substantially the same as that of a conventional air conditioning system can be obtained.

With this layout, control information which is necessary only for the same refrigerant system is required only to be conveyed from the gateway device 101 to the terminals 111.

Further, only control information which concerns a plurality of air-conditioning outdoor units is conveyed through the gateway device 101.

Therefore, not only an effect of restraining traffic from the gateway device 101 to the terminal 110 (to the air-conditioning management control apparatus) is obtained, but also control information is prevented from being conveyed from another gateway device 101 to the terminals 111 (air-conditioning indoor and outdoor units).

As a result, an effect of restraining traffic can be obtained on the entire network.

The embodiments of the present invention have been described above. Two or more of these embodiments may be implemented in combination.

Alternatively, one of these embodiments may be implemented partially.

Alternatively, two or more of these embodiments may be implemented partially in combination.

The present invention is not limited to these embodiments, and various modifications are possible as appropriate.

Lastly, an example of the hardware configuration of the gateway devices presented in the first to fourth embodiments will be described with reference to FIG. 15.

Each of the gateway devices is a computer, and each component of the gateway device can be realized by a program.

As the hardware configuration of the gateway device, an arithmetic device 901, an external memory device 902, a main memory device 903, a communication device 904, and an input/output device 905 are connected to a bus.

The arithmetic device 901 is a CPU that executes programs.

The external memory device 902 is, for example, a ROM (Read Only Memory), a flash memory, and a hard disk device.

The main memory device 903 is a RAM (Random Access Memory).

The terminal information storage table memory unit 1, the terminal information exchange history storage unit 10, and the relay history storage unit 12 are realized by the external memory device 902 or the main memory device 903.

The communication device 904 corresponds to the first communication unit 5 and the second communication unit 6.

The input/output device 905 is, for example, a mouse, a keyboard, a display device, and the like.

The programs are normally stored in the external memory device 902, and are loaded into the main memory device to be sequentially read and executed by the arithmetic device 901.

The programs realize the functions described as "units" (excluding the terminal information storage table memory unit 1, the terminal information exchange history storage unit 10, and the relay history storage unit 12; the same also applies hereinafter) illustrated in FIG. 1.

Further, the external memory device 902 also stores an operating system (OS), and at least a part of the OS is loaded into the main memory device 903. The arithmetic device 901 executes each program that realizes the function of each "unit" illustrated in FIG. 1 while executing the OS.

Information, data, signal values, and variable values indicating results of processes described as "judge", "determine", "extract", "detect", "set", "register", "select", "refer", "generate", "input", "output", "receive", "transmit", and so on in the description of the first to fourth embodiments are stored as files in the main memory device 903.

Figure 15:
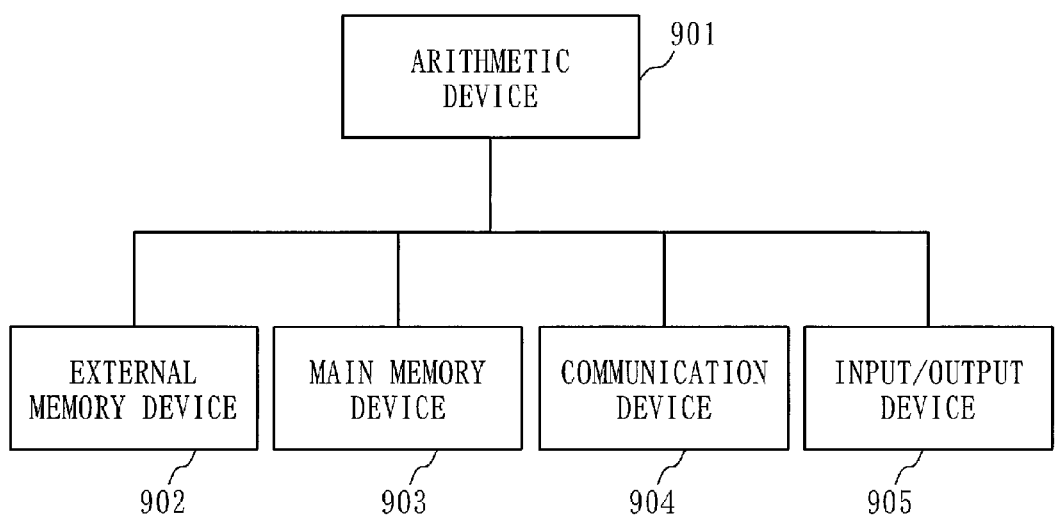
FIG. 15 is a diagram illustrating an example of the hardware configuration of the gateway devices according to the first to fourth embodiments.

The configuration of FIG. 15 is an example of the hardware configuration of the gateway devices, and the configuration of the gateway devices is not limited to and may be different from the configuration described in FIG. 15.

The hardware configuration of the terminal devices presented in the first to fourth embodiments may be the same as or different from the hardware configuration of FIG. 15.

REFERENCE SIGNS LIST

1: terminal information storage table memory unit, 2: relay processing unit, 3: terminal search processing unit, 4:

management communication processing unit, 5: first communication unit, 6: second communication unit, 10: terminal information exchange history storage unit, 11: history information exchange unit, 12: relay history storage unit, 100: gateway device, 101: gateway device, 102: gateway device, 110: terminal device, 111: terminal device, 112: terminal device, 130: gateway device, 131: gateway device, 132: gateway device, 150: gateway device, 151: gateway device, 152: gateway device

The invention claimed is:

1. A gateway device being connected to an internal network to which are connected one or more internal terminal devices, and being connected to an external network to which are connected a plurality of relay devices to each of which are connected one or more external terminal devices, the gateway device comprising:
 a memory including a connection relation table indicating, in each record, an external terminal device and a relay device to which the external terminal device is connected; and
 processing circuitry to:
 each time a communication packet whose destination is any one of the external terminal devices is received from the internal network, refer to the connection relation table, and transmit by broadcasting or multicasting to the external network an investigation packet for investigating a relay device to which a destination external terminal device is connected when a record on the destination external terminal device of the communication packet does not exist in the connection relation table, receive from the relay device to which the destination external terminal device is connected a connection notification packet for notifying that the destination external terminal device is connected to the relay device, and update the connection relation table based on the connection notification packet received;
 when the connection relation table is erased as a result of restarting the gateway device, transmit by broadcasting or multicasting to the external network a re-notification request packet for requesting the relay device that has transmitted the connection notification packet to re-notify of the external terminal device that has been notified in the connection notification packet; and
 receive from the relay device that has transmitted the connection notification packet a re-notification response packet for re-notifying of the external terminal device that has been notified in the connection notification packet, and restore the connection relation table based on the re-notification response packet received.

2. The gateway device according to claim 1,
 wherein when the connection relation table is erased, the processing circuitry transmits by broadcasting or multicasting the re-notification request packet to the external network, before receiving a communication packet from the internal network.

3. The gateway device according to claim 1,
 wherein the processing circuitry transmits by broadcasting or multicasting to the external network a packet for inquiring about a relay device to which the destination external terminal device is connected, as the investigation packet, and
 receives the connection notification packet from the relay device to which the destination external terminal device is connected, as a response to the investigation packet.

4. The gateway device according to claim 1,
 wherein the processing circuitry transmits by broadcasting or multicasting to the external network the communication packet received from the internal network, as the investigation packet, and
 receives, as the connection notification packet, a packet which is transmitted by the destination external terminal device in response to the communication packet, and is relayed by the relay device to which the destination external terminal device is connected, and in which information for notifying that the destination external terminal device is connected to the relay device has been added by the relay device.

5. The gateway device according to claim 1,
 wherein when the connection relation table is erased as a result of restarting the gateway device, the processing circuitry transmits by broadcasting or multicasting the re-notification request packet to the external network.

6. The gateway device according to claim 1,
 wherein the gateway device is connected to an internal network to which are connected a plurality of internal terminal devices, and is connected to an external network to which is connected a specific relay device that relays every communication packet from the internal network and registers an internal terminal device that has transmitted a communication packet being relayed,
 wherein each time a communication packet is received from the internal network, the processing circuitry refers to the connection relation table, and registers an internal terminal device that has transmitted the communication packet in the connection relation table when the internal terminal device that has transmitted the communication packet has not been registered in the connection relation table,
 wherein when the connection relation table is erased, the processing circuitry transmits to the specific relay device a terminal notification request packet for requesting to notify of the internal terminal device being registered in the specific relay device, and
 wherein the processing circuitry receives from the specific relay device a terminal notification response packet for notifying of the internal terminal device being registered in the specific relay device, and restores the connection relation table based on the terminal notification response packet received.

7. The gateway device according to claim 1,
 wherein the gateway device is connected to an internal network to which are connected a plurality of internal terminal devices, and is connected to an external network to which are connected a plurality of relay devices, each of which, when relaying a communication packet from the internal network, registers an internal terminal device that has transmitted the communication packet being relayed,
 wherein each time a communication packet is received from the internal network, the processing circuitry refers to the connection relation table, and registers an internal terminal device that has transmitted the communication packet in the connection relation table when the internal terminal device that has transmitted the communication packet has not been registered in the connection relation table,
 wherein when the connection relation table is erased, the processing circuitry transmits by broadcasting or multicasting to the external network a terminal notification request packet for requesting to notify of the internal terminal device being registered in each relay device, and wherein the processing circuitry receives from each terminal device a terminal notification response packet for notifying of the internal terminal device being registered in each relay device, and restores the connection relation table based on the terminal notification response packet received.

8. A gateway device to be connected to an internal network and an external network, in place of another gateway device, when the another gateway device is disconnected from the internal network and the external network, the another gateway device being connected to the internal network to which are connected one or more internal terminal devices, and being connected to the external network to which are connected a plurality of relay devices to each of which are connected one or more external terminal devices, the gateway device comprising:

a memory including a connection relation table indicating, in each record, an external terminal device and a relay device to which the external terminal device is connected, the another gateway device, each time a communication packet whose destination is any one of the external terminal devices is received from the internal network, referring to the connection relation table, and when a record on a destination external terminal device of the communication packet does not exist in the connection relation table, transmitting by broadcasting or multicasting to the external network an investigation packet for investigating a relay device to which the destination external terminal device is connected, receiving from the relay device to which the destination external terminal device is connected a connection notification packet for notifying that the destination external terminal device is connected to the relay device, and updating the connection relation table based on the connection notification packet received; and processing circuitry configured to:

when the connection relation table is erased as a result of restarting the gateway device, transmit by broadcasting or multicasting to the external network a re-notification request packet for requesting the relay device that has transmitted the connection notification packet to re-notify of the external terminal device that has been notified in the connection notification packet; and receive from the relay device that has transmitted the connection notification packet a re-notification response packet for re-notifying of the external terminal device that has been notified in the connection notification packet, and restore the connection relation table based on the re-notification response packet received.

* * * * *